No. 748,936. PATENTED JAN. 5, 1904.
F. C. EDELEN.
COMBINED FLOOR DRAIN AND BACKWATER TRAP.
APPLICATION FILED NOV. 22, 1902.
NO MODEL.
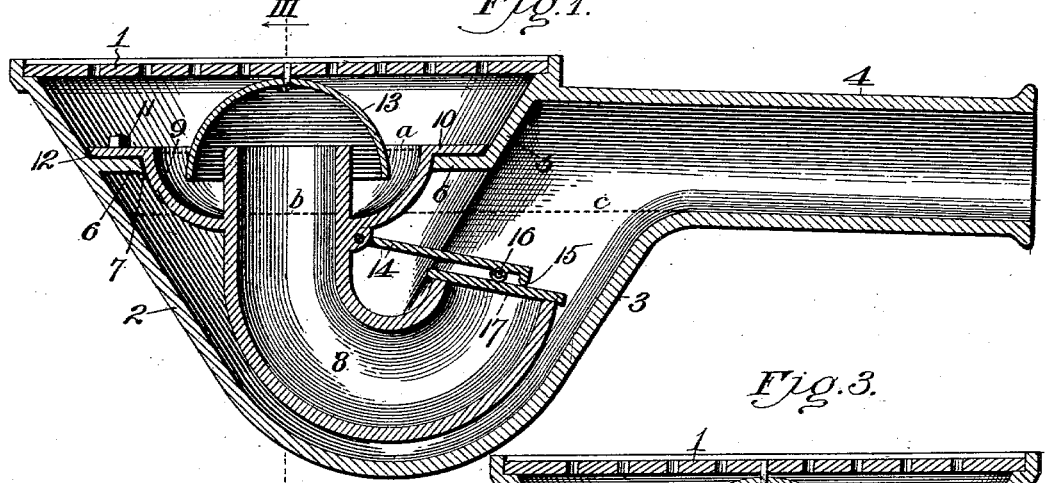
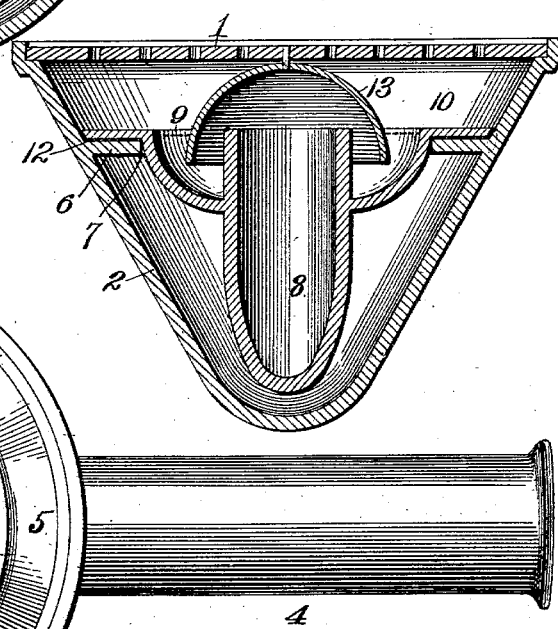
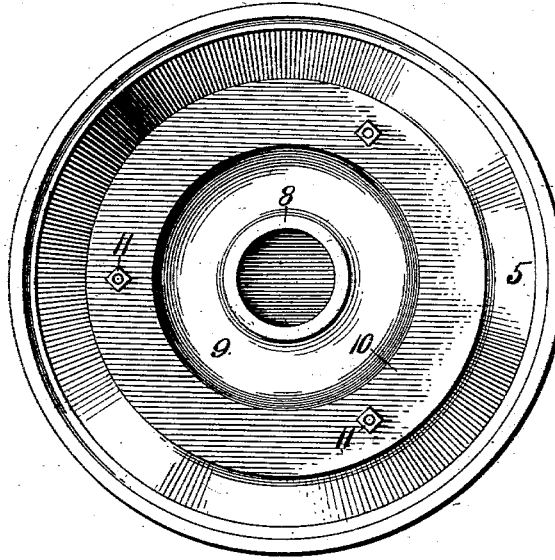
Witnesses:
A. Thorpe
A. McArthur
Inventor:
F. C. Edelen.
By George J. Thorpe, atty.

No. 748,936. Patented January 5, 1904.

UNITED STATES PATENT OFFICE.

FREDERICK C. EDELEN, OF KANSAS CITY, MISSOURI, ASSIGNOR TO CRAMPTON FARLEY BRASS CO., A CORPORATION OF MISSOURI.

COMBINED FLOOR-DRAIN AND BACKWATER-TRAP.

SPECIFICATION forming part of Letters Patent No. 748,936, dated January 5, 1904.

Application filed November 22, 1902. Serial No. 132,447. (No model.)

*To all whom it may concern:*

Be it known that I, FREDERICK C. EDELEN, a citizen of the United States, residing at Kansas City, in the county of Jackson and State of Missouri, have invented certain new and useful Improvements in a Combined Floor-Drain and Backwater-Trap, of which the following is a specification.

My invention relates to combined floor-drains and backwater-traps, and has for its object to produce a device of this character having a trap which acts as a bar against backflow of gas or as a jet-pipe for the purpose of creating a suction whereby the lower chamber of the basin shall be drained of the water left by the preceding charge and rendered offensively odorous by the gas or water from the sewer.

A further object is to provide a trap to act as a jet-pipe, with its discharge end submerged in the water of the basin and equipped with a submerged gate, so that lint clinging to such end or gate shall be kept soft, and therefore more easily dislodged by the spurt of water incidental to each flushing operation, it being well known that lint between a valve and its seat renders the joint sufficiently imperfect to permit water to seep therethrough.

Another object is to produce a device of this character composed of parts which can be easily and quickly assembled together or separated, so as to give quick and easy access for cleaning or for the removal of an obstruction contiguous to the sink, and which is of simple, durable, and inexpensive construction.

To these ends the invention consists in certain novel and peculiar features of construction and organization, as hereinafter described and claimed, and in order that it may be fully understood reference is to be had to the accompanying drawings, in which—

Figure 1 represents a vertical longitudinal section of the device. Fig. 2 is a top plan view with the perforated drain-plate removed. Fig. 3 is a section taken on the line III III of Fig. 1.

Referring to the drawings in detail, 1 designates the perforated drain-plate, the same resting loosely in the upper end of the inverted conical basin 2. The latter is formed at its front side with a communicating-channel portion 3, connected at its upper end to the drain-pipe 4, leading to the sewer, said pipe connecting with the upper end of the channel portion in order that it may have a suitable fall or pitch to carry off water if the sewer happens to be near the surface of the ground, as frequently occurs in dwelling-houses. At the junction of said pipe 4 with the basin occurs a depending partition 5, forming a portion of the basin, and from the latter coincidental with the lower end of said partition a circular and substantially horizontal flange 6 projects inwardly, so as to form a central opening 7.

A trap 8 of J shape has its stem portion arranged centrally of the trap-body and its hook projecting upwardly into and about centrally of the channel portion 3, said trap being of smaller diameter than the basin, so as to provide an annular space between the two, wherein may stand a comparatively large body of water as a bar against back pressure of gas from the sewer, it being well known that such gas will break through the point of least resistance, and for the further purpose of producing a jet of water which will by suction effect the discharge of the water left standing in the basin below the partition by the preceding discharge of the jet-pipe.

9 designates a cup integrally formed with said stem below the upper end of the latter, which cup depends through opening 7 and is provided with an outwardly-projecting flange 10, resting upon and bolted rigidly to flange 6, as at 11, a lead or equivalent washer 12 being interposed between said flanges, so as to insure a water and gas tight joint at such point.

13 designates a bell suspended centrally from the drain-plate and having its lower end within the cup and inclosing the upper end of the stem to provide a seal against gas arising from the water of the trap and for a further purpose hereinafter explained.

14 designates a lever pivoted at one end to the trap, so as to operate in a vertical plane in the trap-body and communicating channel portion 3, and provided at its opposite or free end with a depending lug 15, and pivoted to said lever between its free and pivoted ends, as at 16, is a gate 17, adapted to be seated upon the upper end of the hook and close communication between the latter and the basin below flange 6. In the operation of the lever the gate is permitted to oscillate slightly, so that it may articulate perfectly with the gate-seat. This oscillation, however, is slight, because upward movement of the rear portion of the gate is limited by contact with the lever inward of pivotal point 16, while upward movement of the outer portion of the gate is limited by contact with lug 15 of the lever. As a result the gate is always in position to properly engage the seat on the downward movement of the lever.

By the construction described it will be apparent that a triple water seal is provided whereby access of sewer-gas by way of the trap to the house is effectually cut off, the water in the basin below flange 6, but above gate 17, forming one seal, that in the trap forming a second seal, and that in the cup forming the third seal. It is also obvious that the gate 17, seated under its gravitative tendency and the weight of the water above the same and below flange 6, forms an effectual bar against water flowing back from the sewer and up through the drain. The water which stands in the cup forms a seal therein of comparatively fresh water against backflow of gas from the trap, this water-line being represented by the line $a$, while that in the trap forms a seal of water which is also comparatively fresh and odorless and may be represented by the line $b$. These two seals of comparatively fresh water guard against the penetration of the building by odor from the water of the trap proper, as at $c$, and the last-named water in turn forms a seal or barrier against the backflow of gas from the sewer.

The operation attendant upon the flow of water is obvious—that is to say, it enters the basin through the drain-plate and from the cup overflows into the trap and raising the gate enters the channel portion 3 and passes through pipe 4 to the sewer and carries with it the water of the basin below its partition. The gate automatically reseats itself as the supply of water entering the basin is exhausted. The water then stands in the cup, trap, and basin at the levels $a$, $b$, and $c$, respectively, leaving a fresh air-space in the upper end of the trap-stem to further diminish the possibility of an objectional odor entering the building.

When access is desired for the purpose of cleaning or removing an obstruction from the trap, the drain-plate is lifted out of the basin, carrying with it by preference the bell 13. The trap may then be unbolted from flange 6 and drawn up through the opening 7, these operations being reversed for the purpose of reassembling such parts in their proper positions, as will be readily understood.

From the above description it will be apparent that I have produced a combined floor-drain and backwater-trap which embodies the features of advantage enumerated as desirable in the statement of invention and which may be modified in some particulars without departing from the spirit and scope or sacrificing any of its advantages, and in this connection it will also be apparent that an effectual gas seal is provided whether the gate is employed or not and that the disposition of the gate at some other point where it would prevent the backflow of water would not be a departure from the principle of construction involved, though it is preferable to dispose it as shown.

Having thus described the invention, what I claim as new, and desire to secure by Letters Patent, is—

1. In a device of the character described, a basin having an inwardly-projecting flange and a channel portion communicating therewith below said flange, a J-shaped trap supported within the basin and having its hook portion disposed to discharge water up through said channel portion, and its stem communicating with the basin above said partition.

2. In a device of the character described, a basin having an inwardly-projecting flange and a channel portion communicating therewith below said flange, a J-shaped trap supported within the basin and having its hook portion disposed to discharge water up through said channel portion, and its stem communicating with the basin above said partition, and a gate normally closing the hook end of the trap.

3. In a device of the character described, a basin having an inwardly-projecting flange and a channel portion communicating therewith below said flange, a J-shaped trap supported within the basin and having its hook portion disposed to discharge water up through said channel portion and its stem communicating with the basin above said partition, and provided with a surrounding cup forming a tight joint with said flange.

4. In a device of the character described, a basin having an inwardly-projecting flange and a channel portion communicating therewith below said flange, a J-shaped trap supported within the basin and having its hook portion disposed to discharge water up through said channel portion and its stem communicating with the basin above said partition, and provided with a surrounding cup forming a tight joint with said flange, and a bell inclosing the upper end of said stem and depending within said cup.

In testimony whereof I affix my signature in the presence of two witnesses.

FRED. C. EDELEN.

Witnesses:
FERD L. CRAMPTON,
G. Y. THORPE.